United States Patent
Banzai

(10) Patent No.: US 9,856,387 B2
(45) Date of Patent: *Jan. 2, 2018

(54) COLOR PENCIL LEAD

(71) Applicant: Mitsubishi Pencil Company, Limited, Shinagawa-ku, Tokyo (JP)

(72) Inventor: Satoru Banzai, Fujioka (JP)

(73) Assignee: MITSUBISHI PENCIL COMPANY, LIMITED, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/119,018

(22) PCT Filed: Feb. 20, 2015

(86) PCT No.: PCT/JP2015/054831
§ 371 (c)(1),
(2) Date: Aug. 15, 2016

(87) PCT Pub. No.: WO2015/129583
PCT Pub. Date: Sep. 3, 2015

(65) Prior Publication Data
US 2016/0362574 A1 Dec. 15, 2016

(30) Foreign Application Priority Data
Feb. 27, 2014 (JP) .................. 2014-036573

(51) Int. Cl.
| | | |
|---|---|---|
| *C09D 13/00* | (2006.01) | |
| *B43K 19/02* | (2006.01) | |
| *B43K 19/18* | (2006.01) | |
| *B43K 21/00* | (2006.01) | |
| *C09D 101/02* | (2006.01) | |
| *C09D 129/14* | (2006.01) | |
| *C09D 161/06* | (2006.01) | |
| *C08K 3/34* | (2006.01) | |
| *C08K 5/00* | (2006.01) | |
| *C08K 7/24* | (2006.01) | |

(52) U.S. Cl.
CPC .............. *C09D 13/00* (2013.01); *B43K 19/02* (2013.01); *B43K 19/18* (2013.01); *B43K 21/003* (2013.01); *C09D 101/02* (2013.01); *C09D 129/14* (2013.01); *C09D 161/06* (2013.01); *C08K 3/34* (2013.01); *C08K 5/0041* (2013.01); *C08K 7/24* (2013.01)

(58) Field of Classification Search
CPC ..................................................... C09D 13/00
See application file for complete search history.

(56) References Cited

U.S. PATENT DOCUMENTS

| | | | | |
|---|---|---|---|---|
| 3,821,157 A * | 6/1974 | Muller | ................... | C09D 13/00 106/31.11 |
| 3,976,488 A * | 8/1976 | Nihyakumen | ........... | G03C 1/58 106/31.07 |
| 5,591,787 A * | 1/1997 | Schlennert | ............. | B43K 19/02 252/301.35 |
| 5,595,700 A | 1/1997 | Kitazawa | | |
| 5,645,629 A * | 7/1997 | Kitazawa | ............... | C09D 13/00 106/31.11 |
| 5,733,482 A * | 3/1998 | Hoshiba | ................. | C09D 13/00 264/29.1 |
| 6,011,084 A * | 1/2000 | Leidner | ................... | C09D 13/00 523/164 |
| 6,492,435 B1 * | 12/2002 | Miyamoto | ............. | C09D 11/18 523/161 |
| 6,645,279 B1 * | 11/2003 | Kitazawa | ............... | C09D 13/00 106/31.11 |
| 6,709,501 B2 * | 3/2004 | Satoh | ...................... | C09D 13/00 106/287.12 |
| 6,770,688 B1 * | 8/2004 | Miyamoto | ............. | C09D 11/18 106/31.6 |
| 6,776,829 B2 * | 8/2004 | Miyamoto | ............. | C09D 11/18 106/31.02 |
| 2011/0129284 A1 * | 6/2011 | Thies | ...................... | A45D 40/20 401/49 |
| 2011/0151108 A1 * | 6/2011 | Lugert | ................... | C09D 13/00 427/11 |

FOREIGN PATENT DOCUMENTS

| | | |
|---|---|---|
| JP | S 59-157161 A | 9/1984 |
| JP | S 60-264296 A | 12/1985 |
| JP | H 05-039449 A | 2/1993 |
| JP | H 10-237377 A | 9/1998 |
| JP | H 11-286643 A | 10/1999 |
| JP | 2002-188034 A | 7/2002 |
| JP | 2015-054860 A | 3/2015 |

OTHER PUBLICATIONS

PCT International Preliminary Report on Patentability (IPRP) and Written Opinion dated Sep. 9, 2016, in corresponding International Application No. PCT/JP2015/054831 ( 9 pages).
International Search Report (PCT/ISA/210) dated May 12, 2015, by the Japanese Patent Office as the International Searching Authority for International Application No. PCT/JP2015/054831.
Written Opinion (PCT/ISA/237) dated May 12, 2015, by the Japanese Patent Office as the International Searching Authority for International Application No. PCT/JP2015/054831.

* cited by examiner

*Primary Examiner* — Veronica F Faison
(74) *Attorney, Agent, or Firm* — Buchanan, Ingersoll & Rooney PC

(57) ABSTRACT

Provided is a color pencil lead which is excellent in a hue, a light resistance and a strength and can be erased with an eraser and which is suited to pencil leads for mechanical pencils and wooden pattern holder pencils. The above color pencil lead is characterized by containing a resin in which a dye is dissolved or included in a pencil lead body.

8 Claims, No Drawings

COLOR PENCIL LEAD

TECHNICAL FIELD

The present invention relates to a calcined or non-calcined color pencil lead which is excellent in a hue and an erasability with an eraser without damaging a strength and a light resistance.

BACKGROUND ART

Disclosed as a conventional "non-calcined color pencil lead which can be erased with an eraser" is, for example, a non-calcined color pencil lead prepared by producing a porous color lead body which is not blended with waxes and then filling liquid oils and fats or waxes in the pores at ordinary temperature (refer to, for example, a patent document 1).

However, the above color pencil lead involved a problem in terms of that it had a sufficiently high strength as a pencil lead for a usual wooden pattern holder but was fragile when it was used in the form of a narrow lead for a so-called holder of a mechanical pencil and the like.

In addition, mainly available as a conventional "calcined color pencil lead which can be erased with an eraser" is, for example, a lead prepared by producing a white or light-colored porous lead body and then filling a dye ink in the pores thereof (refer to, for example, a patent document 2).

However, the existing situation was that the above color pencil lead involved the problems that a lead body strength thereof depended on a strength of the white or light-colored porous lead body and that a weatherability, a hue and the like of the dye were never strengthened.

PRIOR ART DOCUMENTS

Patent Documents

Patent document 1: JP-A Hei5-39449 (claims, examples and the like)
Patent document 2: JP-A Hei10-237377 (claims, examples and the like)

DISCLOSURE OF THE INVENTION

In light of the problems on the conventional techniques and the existing situation each described above, the present invention tries to solve them, and an object thereof is to provide a calcined or non-calcined color pencil lead which is excellent in a hue, a light resistance and a strength and which can be erased with an eraser.

In light of the conventional problems and the like described above, intense researches repeated by the present inventors have resulted in finding that a color pencil lead which meets the object described above is obtained by impregnating the pores of a pencil lead body with a resin in which a dye is included. Thus, they have come to complete the present invention.

That is, the present invention resides in the following items (1) to (10).
(1) A color pencil lead containing a resin in which a dye is dissolved or a resin in which a dye is included, in a pencil lead body.
(2) The color pencil lead as described in the above item (1), wherein the pores of the pencil lead body are filled with the resin in which the dye is dissolved or the resin in which the dye is included.
(3) The color pencil lead as described in the above item (1) or (2), wherein the resin in which the dye is dissolved or the resin in which the dye is included is soluble in an organic solvent.
(4) The color pencil lead as described in the above item (1) or (2), wherein the resin in which the dye is dissolved or the resin in which the dye is included is a dyeing resin.
(5) The color pencil lead as described in any one of the above items (1) to (4), wherein the resin in which the dye is dissolved or the resin in which the dye is included has a film form having a thickness of 1 µm or less.
(6) The color pencil lead as described in any one of the above items (1) to (5), wherein the pencil lead body is a calcined ceramic lead body prepared by blending at least boron nitride with a ceramic binder, and calcining the blending.
(7) The color pencil lead as described in any one of the above items (1) to (5), wherein the pencil lead body is a non-calcined ceramic lead body prepared by blending at least a ceramic binder, and molding the blending.
(8) The color pencil lead as described in any one of the above items (1) to (5), wherein the pencil lead body is a non-calcined ceramic lead body prepared by blending at least talc with a resin, and molding the blending.
(9) The color pencil lead as described in any one of the above items (1) to (5), wherein the pencil lead body is a calcined lead body prepared by blending at least graphite, and calcining the blending.
(10) The color pencil lead as described in any one of the above items (1) to (9), wherein it is impregnated with a lubricant.

According to the present invention, provided is a calcined or non-calcined color pencil lead which is excellent in a hue, a light resistance and a strength and which can be erased with an eraser.

EMBODIMENTS FOR CARRYING OUT THE PRESENT INVENTION

The embodiments of the present invention shall be explained below in detail.

The color pencil lead of the present invention is characterized by containing a resin in which a dye is dissolved or a resin in which a dye is included in a pencil lead body.

The production process for the color pencil lead of the present invention shall not specifically be restricted as long as it contains a resin in which a dye is dissolved or a resin in which a dye is included (hereinafter referred to merely as "a resin in which a dye is dissolved or included") in a pencil lead body. The pencil lead can be obtained by, for example, 1) blending the respective components including an extender, a binder component such as a thermoplastic synthetic resin, an organic solvent and the like with a resin in which a dye is dissolved or included, molding the blending, and then subjecting the molding to calcining treatment or non-calcining treatment (hereinafter the above embodiment shall be referred to as "kneading molding type color pencil lead"), and 2) preparing a blend composition suitably selected from the respective components including at least an extender, a binder component such as a thermoplastic synthetic resin, an organic solvent and the like, and subjecting the composition to calcining treatment or non-calcining treatment to obtain a porous pencil lead body, and filling the pores of the above pencil lead body with a resin in which a dye is dissolved or included (hereinafter the above embodiment shall be referred to as "filling type color pencil lead").

The extender which can be used shall not specifically be restricted as long as it is used for conventional pencil lead bodies, and any ones can be used. For example, white extenders and color extenders such as boron nitride, kaolin (kaolinite, halloysite), talc, mica, calcium carbonate, and the like can be used as well, and naturally mixtures of several kinds thereof can be used as well. Particularly preferably, it includes boron nitride, kaolin and talc in terms of physical properties and forms thereof.

The binder component which can be used shall not specifically be restricted as long as it is used for conventional pencil lead bodies, and any ones can be used. It includes, for example, celluloses such as carboxymethyl cellulose and the like, polyvinyls such as polyvinylpyrrolidone and the like, polyethers such as polyoxyethylene and the like, acrylic acids such as polyacrylic acid and the like, inorganic polymers such as tetraethyl orthosilicate (TEOS) condensates and the like, clays such as montmorillonite, bentonite and the like, ceramic glasses, and the like. They can be used alone or in a mixture of two or more kinds thereof.

Also, the thermoplastic synthetic resin used includes, for example, polyvinyl alcohol, polyvinyl chloride, chlorinated polyvinyl chloride, polyamide, polyethylene, polypropylene, polyetheretherketone, and the like.

The organic solvent used is preferably a solvent which can dissolve the thermoplastic synthetic resins described above, and to be specific, capable of being used are dioctyl phthalate (DOP), dibutyl phthalate (DBP), tricresyl phosphate, dioctyl adipate, diallyl isophthalate, propylene carbonate, alcohols, ketones, esters and the like.

The respective specific kneading molding type color pencil leads and filling type color pencil leads are selected according to uses for mechanical pencils, wooden pattern holder pencils and the like, and the kinds of the treatments such as a calcined type and a non-calcined type.

The calcined type lead includes, for example, a calcined ceramic lead body prepared by blending at least boron nitride and a ceramic binder and calcining the blending, a calcined lead body prepared by blending at least graphite and calcining the blending, a calcined lead body prepared by blending at least boron nitride and stratified silicate minerals and calcining the blending, a calcined lead body prepared by blending at least talc and a stratified silicate mineral and calcining the blending, and the like.

The non-calcined type lead includes, for example, a non-calcined ceramic lead body prepared by blending at least a ceramic binder and molding the blending, a non-calcined ceramic lead body prepared by blending at least talc and a resin such as carboxymethyl cellulose and molding the blending, a non-calcined ceramic lead body prepared by blending at least boron nitride and boron oxide and molding the blending, a non-calcined ceramic lead body prepared by blending at least boron nitride and silicon oxide and molding the blending, and the like.

The ceramic binder includes, for example, boron nitride, silicon oxide, aluminum oxide, stratified silicate minerals, and calcined products thereof, and the graphite includes, for example, natural graphite, artificial graphite, kish graphite, expansion graphite, expanded graphite, and the like.

In the color pencil lead of the present invention, the respective components including the extender, the binder component such as a thermoplastic synthetic resin, the organic solvent each described above, water, and the like are blended with the resin in which the dye is dissolved or included in the case of the kneading molding type color pencil lead; to be specific, the respective components (the extender, the binder component, the thermoplastic synthetic resin, the organic solvent, and the like) which are used for, for example, a calcined color pencil lead and a non-calcined color pencil lead for a mechanical pencil, and a calcined or non-calcined color pencil lead for pencils other than a mechanical pencil according to whether or not the pencil lead is a calcined type or a non-calcined type and the kind of the materials used are kneaded with the resin in which the dye is dissolved or included, and the kneaded matter is molded, dried and then subjected to calcining treatment under non-oxidative environment, and/or calcining treatment under the air, or subjected to non-calcining treatment (drying at a low temperature of 50 to 120° C.) after kneading, molding and drying as described above to obtain a color pencil lead body; and the lead body is preferably further impregnated with a lubricant, whereby the kneading molding type color pencil lead can be produced.

Also, in the case of the filling type color pencil lead, the various pencil lead bodies are obtained by the calcining treatment or the non-calcining treatment described above; to be specific, the respective components (the extender, the binder component, the thermoplastic synthetic resin, the organic solvent, water, and the like) which are used for, for example, a calcined color pencil lead and a non-calcined color pencil lead for a mechanical pencil, and a calcined or non-calcined color pencil lead for pencils other than a mechanical pencil according to whether or not the pencil lead is a calcined type or a non-calcined type and the kind of the materials used are kneaded, and the kneaded matters are molded, dried and then subjected to calcining treatment under non-oxidative environment, and/or calcining treatment under the air, or subjected to non-calcining treatment (drying at a low temperature of 50 to 120° C.) after kneading, molding and drying as described above to obtain the respective porous color pencil lead bodies; and the pores of the above pencil lead bodies are impregnated with the resin in which the dye is dissolved or included by using alcohol and the like and preferably further filled with a lubricant, whereby the filling type color pencil lead can be produced.

The dye which can be used includes oil-soluble dyes, salt-forming dyes composed of the cations of dimethyldistearylammonium salts and acid dyes, and the like in terms of an erasability and a water resistance.

The oil-soluble dyes include, for example, C. I. Solvent Yellow 2, C. I. Solvent Yellow 6, C. I. Solvent Red 25, C. I. Solvent Red 49, C. I. Solvent Violet 8, C. I. Solvent Blue 25, C. I. Solvent Black 22, and the like, and commercial products thereof. The acid dyes include, for example, C. I. Acid Yellow 1, C. I. Acid Yellow 3, C. I. Acid Orange 10, C. I. Acid Orange 28, C. I. Acid Red 51, C. I. Acid Red 57, C. I. Acid Violet 7, C. I. Acid Blue 22, C. I. Acid Green 40, C. I. Acid Brown 45, C. I. Acid Black 51, and the like, and commercial products thereof.

The resin in which the dye used is dissolved has to be a resin which is soluble in alcohols and the like and provides a low solution viscosity and which has a high affinity with the dye used, and it includes, for example, various modified phenol resins, ketone resins, maleic acid resins, aldehyde resins, and the like.

The resin in which the dye is included is a resin in which the dye is included in resin molecules and includes, for example, dyed resins and doped resins.

The kind of the resin in which the dye described above is dissolved or included includes, for example, resins which are insoluble in water, such as butyral resins, various modified phenol resins, ketone resins, maleic acid resins, aldehyde resins, alkyl celluloses such as ethyl cellulose and the like, acryl resins, sulfonic acid resins and the like, and they are soluble in organic solvents.

The organic solvents include, for example, isopropyl alcohol (IPA), ethanol, methoxymethylbutanol, benzyl alcohol, toluene, xylene, acetone, methyl ethyl ketone, ethyl acetate, ethyl cellosolve, phenyl cellosolve, benzyl alcohol and the like.

The resin in which the dye is dissolved includes, to be specific, resins produced by a method in which the dye for coloring the resin is kneaded into the resin, a method in which the dye and the resin are dissolved in an organic solvent at a prescribed rate, to be specific, the dye:the resin of 10:1 to 1:2, preferably 3:1 to 1:1 in terms of a mass ratio and in which the solution is used as it is or after removing the solvent, and the like.

Also, the resin in which the dye is included includes, to be specific, resins produced by a method in which the dye is added in the polymerization process of the resin, a method in which the dye is chemically bonded to the resin molecules, and the like. In the above methods, a proportion of the dye:the resin is 5:1 to 1:3, preferably 3:1 to 1:1 in terms of a mass ratio.

The resin in which the dye is dissolved or included has more preferably a film form having a thickness of 1 μm or less. The film form having a thickness of 1 μm or less can be obtained by impregnating a porous pencil lead having a pore size of 1 μm or less with the resin and optimizing a concentration of the resin in an organic solvent.

The lubricant used includes, for example, paraffin oils, α-olefin oils, ester oils such as fatty acid esters, alkylene glycol ethers and the like, synthetic oils such as silicone oils and the like, vegetable oils such as castor oil and the like, greases, and the like.

In the present invention, the calcined color pencil lead for a mechanical pencil can be produced by dispersing and mixing, for example, (a) 40 to 70% by mass of the extender such as boron nitride and the like in total, (b) 20 to 50% by mass of the binder component such as bentonite and the like, and (c) 10 to 30% by mass of water and the organic solvent by means of a Henschel mixer, kneading the mixture by means of a pressure kneader or a double roll, molding it by means of an extrusion molding machine, and then drying the molding at 110 to 250° C. in an electric furnace, followed by calcining it at 800 to 1400° C. for 20 to 40 hours under non-oxidative atmosphere (under nitrogen gas atmosphere or inert gas atmosphere) to obtain a pencil lead body, impregnating the pores of the above pencil lead body with a solution prepared by dissolving the foregoing resin in which the dye is dissolved or included in alcohol, drying it, and preferably further impregnating it with the lubricant.

Also, the non-calcined color pencil lead for a mechanical pencil can be produced by dispersing and mixing, for example, (a) 20 to 80% by mass of talc in total, (b) 20 to 50% by mass of carboxymethyl cellulose, and (c) 10 to 20% by mass of water by means of a Henschel mixer, kneading the mixture by means of a pressure kneader or a double roll, molding it by means of an extrusion molding machine, then drying the molding at 110 to 250° C. in an electric furnace to obtain a pencil lead body, impregnating the pores of the above pencil lead body with a solution prepared by dissolving the foregoing resin in which the dye is dissolved or included in alcohol, drying it, and preferably further impregnating it with the lubricant.

Further, the non-calcined ceramic color pencil lead can be produced by dispersing and mixing, for example, (a) 20 to 80% by mass of talc and boron nitride in total, (b) 10 to 70% by mass of the colored resin (the resin in which the dye is dissolved or included) and (c) 10 to 30% by mass of the organic solvent such as benzyl alcohol and the like by means of a Henschel mixer, kneading the mixture by means of a pressure kneader or a double roll, molding it by means of an extrusion molding machine, then removing benzyl alcohol by drying the molding at 100° C. to obtain a pencil lead body, and preferably further impregnating the pencil lead body with the lubricant.

In the color pencil leads thus obtained, a content of the resin in which the dye is dissolved or included is varied according to the kinds of the molding, the solvent and the dye. In terms of allowing a hue, a light resistance and a strength to be compatible to a large extent, it is preferably 10 to 70% by mass, more preferably 15 to 40% by mass based on the whole amount of the color pencil lead in the case of the kneading molding type color pencil lead, and it is preferably 3 to 50% by mass, more preferably 5 to 30% by mass based on the whole amount of the color pencil lead in the case of the filling type color pencil lead.

The color pencil lead of the present invention shall not be restricted to the embodiments described above, and it can be changed and prepared in various manners within the range of the technical scope of the present invention. For example, the foregoing method for filling the pencil leads with the resin in which the dye is dissloved or included may be a method in which the pencil leads are filled with the resin dissloved in wax, a method in which the pencil leads are impregnated with the resin by heating, and the like.

The color pencil lead of the present invention can be a calcined or non-calcined color pencil lead which is excellent in a hue, a light resistance and a strength and which can be erased with an eraser and can exert the above excellent properties because of the following action mechanism.

That is, in the case of the kneading molding type color pencil lead, the pencil lead body containing the resin in which the dye is dissolved or included is strengthened by the resin together with the extender forming the skeleton of the lead body to result in that the material of the color pencil lead is composed only of the materials having a good erasability due to that the strengthening material is the colorant and that the colorant is a solid matter, and in the case of the filling type color pencil lead, the porous skeleton of the lead body is strengthened by the resin to result in that the material of the color pencil lead is composed only of the materials having a good erasability due to that the strengthening material is the colorant and that the colorant is a solid matter. Accordingly, because of the above reasons, obtained is the calcined or non-calcined color pencil lead which is excellent in a hue, a light resistance and a strength and which can be erased with an eraser.

EXAMPLES

Next, the present invention shall be explained in further details with reference to examples and comparative examples, but the present invention shall not be restricted to the examples and the like shown below.

Example 1

Blend Composition:

| | |
|---|---|
| Vinyl chloride resin | 40% by mass |
| Dioctyl phthalate (DOP) | 10% by mass |
| Boron nitride | 50% by mass |

The blend composition described above was kneaded, and the kneaded matter was extruded and molded in the form of a fine line by means of an extruding equipment, followed by heating the fine line at 1000° C. for 5 hours under an inert gas atmosphere to prepare a calcined lead body of boron nitride and binder carbon. The above calcined lead body was heated at 700° C. for 12 hours under an air atmosphere to prepare a calcined lead body of only boron nitride. The above lead body was impregnated with Silicate 40 (manufactured by Colcoat Co., Ltd.), dried and heated at 1000° C. for 5 hours under an inert atmosphere to prepare a white calcined lead body.

The above white lead body was impregnated with the following blend composition and dried at 80° C. for 12 hours.

Blend Composition:

| | |
|---|---|
| Spilon Red C-PH (manufactured by Hodogaya Chemical Co., Ltd.) | 20% by mass |
| Butyral resin: S-LEC BL-1 (manufactured by Sekisui Chemical Co., Ltd.) | 20% by mass |
| Isopropyl alcohol (hereinafter referred to as "IPA") | 60% by mass |

The pores of the calcined lead body obtained by the above drying were impregnated with an α-olefin oil (Spectrasin 4: manufactured by Mobil Oil Co., Ltd.) at 100° C. for 6 hours to obtain a red lead for a mechanical pencil having a diameter of 0.564 mm and a length of 60 mm.

In the embodiment of the present example, the pores of the pencil lead body are impregnated with the resin in which the dye is dissolved. That is, IPA is volatilized by the drying described above, and Spilon Red C-PH stays in a situation in which it is dissolved in the butyral resin and stabilized.

Example 2

Blend composition:

| | |
|---|---|
| Smectite | 40% by mass |
| Distilled water | 10% by mass |
| Boron nitride | 50% by mass |

The blend composition described above was kneaded, and the above kneaded matter was extruded and molded in the form of a fine line by means of an extruding equipment, followed by heating the fine line at 1200° C. for 5 hours in an inert gas atmosphere to prepare a calcined lead body of boron nitride and smectite.

The above lead body was impregnated with the following blend composition and dried at 80° C. for 12 hours.

Blend Composition:

| Ink A | |
|---|---|
| Spilon Red C-GH (manufactured by Hodogaya Chemical Co., Ltd.) | 20% by mass |
| Butyral resin: S-LEC BL-1 (manufactured by Sekisui Chemical Co., Ltd.) | 20% by mass |
| IPA | 60% by mass |

The pores of the calcined lead body obtained by the above drying were impregnated with the α-olefin oil (Spectrasin 4: manufactured by Mobil Oil Co., Ltd.) at 60° C. for 6 hours to obtain a red lead for a mechanical pencil having a diameter of 0.564 mm and a length of 60 mm.

In the embodiment of the present example, the pores of the pencil lead body are impregnated with the resin in which the dye is dissolved. That is, at the time when the ink A described above is dried, Spilon Red C-GH stays in a situation in which it is dissolved in the butyral resin and stabilized.

Example 3

A red lead for a mechanical pencil having a diameter of 0.564 mm and length of 60 mm was obtained in the same manner as in Example 2, except that the ink A described above used in Example 2 was changed to an ink B comprising the following blend composition.

Preparation of Ink B:

| | |
|---|---|
| Dimethyldistearylammonium salt | 20% by mass |
| C.I. Acid Red | 10% by mass |
| Distilled water | 70% by mass |

A 18% by mass hydrochloric acid aqueous solution was dropwise added to the composition described above while stirring to adjust the pH to an acidic side, and then the solution was filtrated. Further, the filtrated matter was further washed with water and a solvent and then dried to thereby obtain a salt-forming dye.

The above salt-forming dye was mixed with toluenesulfonamide and subjected to polycondensation therewith to obtain a color material B, and this was diluted in the following composition to prepare an ink B.

| | |
|---|---|
| Color material B | 30% by mass |
| IPA | 70% by mass |

In the embodiment of the present example, the pores of the pencil lead body are filled with the resin in which the dye is included. That is, IPA is volatilized by drying, and the salt-forming dye described above stays in a situation in which it is included in the resin prepared by the polycondensation.

Example 4

Blend Composition:

| | |
|---|---|
| Carboxymethyl cellulose | 30% by mass |
| DPP Red | 20% by mass |
| Talc | 40% by mass |
| Distilled water | 10% by mass |

The blend composition described above was kneaded, and the kneaded matter was extruded and molded in the form of a fine line by means of an extruding equipment, followed by drying the fine line at 80° C. for 24 hours in the air. Then, the molding was impregnated with the ink A prepared in Example 2 described above and dried at 80° C. for 12 hours. Finally, the pores of the lead body obtained by drying were impregnated with the α-olefin oil (Spectrasin 4: manufactured by Mobil Oil Co., Ltd.) at 60° C. for 6 hours to obtain a red lead for a mechanical pencil having a diameter of 0.564 mm and a length of 60 mm.

In the embodiment of the present example, the resin in which the dye is dissolved is contained in the pencil lead body. That is, Spilon Red C-GH stays in a situation in which it is dissolved in the butyral resin and stabilized by the drying described above.

Example 5

Blend Composition:

| Talc | 50% by mass |
| Spilon Red C-GH (manufactured by Hodogaya Chemical Co., Ltd.) | 10% by mass |
| Alkylphenol resin: (Hitanol 1501, manufactured by Hitachi Chemical Co., Ltd.) | 20% by mass |
| Benzyl alcohol | 20% by mass |

First, Spilon Red C-GH and the alkylphenol resin described above were kneaded, and then the remaining components were added thereto and kneaded. The kneaded matter was extruded and molded in the form of a fine line by means of an extruding equipment and dried at 100° C. for 12 hours. Finally, the pores of the lead body obtained by drying were impregnated with the α-olefin oil (Spectrasin 4: manufactured by Mobil Oil Co., Ltd.) at 100° C. for 6 hours to obtain a red lead for a mechanical pencil having a diameter of 0.564 mm and a length of 60 mm.

In the embodiment of the present example, the resin in which the dye is dissolved is contained in the pencil lead body. That is, Spilon Red C-GH stays in a situation in which it is dissolved in the alkylphenol resin by the kneading of Spilon Red C-GH and the alkylphenol resin which has been carried out previously.

Example 6

Blend Composition:

| Vinyl chloride resin | 40% by mass |
| DOP | 10% by mass |
| Natural scaly graphite | 50% by mass |

The blend composition described above was kneaded, and the above kneaded matter was extruded and molded in the form of a fine line by means of an extruding equipment, followed by heating the fine line at 1000° C. for 5 hours in an inert atmosphere to prepare a calcined lead body of graphite and binder carbon. The above lead body was impregnated with the ink A prepared in Example 2 described above and dried at 80° C. for 12 hours. Finally, the pores of the lead body obtained by drying were impregnated with the α-olefin oil (Spectrasin 4: manufactured by Mobil Oil Co., Ltd.) at 100° C. for 6 hours to obtain a brown lead for a mechanical pencil having a diameter of 0.564 mm and a length of 60 mm.

In the embodiment of the present example, the pores of the pencil lead body are filled with the resin in which the dye is dissolved. That is, Spilon Red C-GH stays in a situation in which it is dissolved in the butyral resin and stabilized by the drying described above.

Comparative Example 1

Blend Composition:

| Boron nitride | 40% by mass |
| Kaolin | 35% by mass |

-continued

| Polyvinyl alcohol | 18% by mass |
| Polyethylene glycol | 7% by mass |

The blend composition described above and water of the same weight were mixed and dispersed by means of a Henschel mixer and kneaded by means of a double roll to control a moisture content. Then, the kneaded matter was extruded and molded in the form of a fine line, and the fine line was subjected to heat treatment at 105° C. for 15 hours in the air in order to remove a moisture therefrom. Thereafter, the fine line was heated up to 1100° C. in an argon gas and calcined at 1100° C. for 1 hour. Further, it was heated and calcined at 700° C. in an oxidative atmosphere to remove carbon matters to obtain a white calcined lead body having a diameter of 0.57 mm.

Next, the calcined lead body described above was dipped in a red solution comprising:

| Spilon Red C-GH (manufactured by Hodogaya Chemical Co., Ltd.) | 25% by mass |
| Ethyl alcohol: | 25% by mass |
| Oleyl alcohol: | 50% by mass | and left standing at ordinary temperature for 24 hours. The lead body was taken out from the solution and then dried at 80° C. for 5 hours to remove ethyl alcohol to obtain a red lead for a mechanical pencil having a diameter of 0.564 mm and a length of 60 mm. In the above case, Spilon Red C-GH stays in a situation in which it is dissolved in oleyl alcohol and does not stay in a situation in which it is dissolved in the resin.

Comparative Example 2

Blend Composition:

| Carboxymethyl cellulose | 30% by mass |
| DPP Red | 20% by mass |
| Talc | 40% by mass |
| Distilled water | 10% by mass |

The blend composition described above was kneaded, and the kneaded matter was extruded and molded in the form of a fine line by means of an extruding equipment and dried at 80° C. for 24 hours in the air. The pores of the lead body thus obtained were impregnated with the α-olefin oil (Spectrasin 4: manufactured by Mobil Oil Co., Ltd.) at 60° C. for 6 hours to obtain a red lead for a mechanical pencil having a diameter of 0.564 mm and a length of 60 mm. DPP Red used is a pigment and stays in a situation in which it is dissolved in the extender and the like, and it is neither included nor dissolved in the resin.

It was confirmed by measuring by the following method that in Examples 1 to 6, the resin in which the dye was included had a film form having a thickness of 1 µm or less.

Also, the leads of the respective colors for a mechanical pencil obtained above were used to evaluate a flexural strength, a color developability of the drawn lines, a light resistance, and an erasability by the following test methods. The results thereof are shown in the following Table 1.

Measuring Method of Thickness of Resin Film:

The lead obtained was cut by a laser, and a cross section thereof was measured by means of an electron microscope (S-4800, manufactured by Hitachi High-Technologies Corporation).

Test Methods:

Evaluation Method of Flexural Strength:

The flexural strength was measured (n=100) based on JIS-S-6005-2007.

Evaluation Method of Color Developability of the Drawn Lines:

Shown (n=100) by a chroma $(a^2+b^2)^{1/2}$ in a L*ab value measured by means of a spectral colorimeter as is the case with a density measuring method using a scriber prescribed in JIS S 6005: 2007.

Evaluation Method of Light Resistance:

Measured (n=100) was a color difference $\Delta E^*ab=[(\Delta L^*)2+(\Delta a^*)2+(\Delta b^*)2]^{1/2}$ observed in exposing the drawn lines scribed above based on JIS L 0841:2004.

Evaluation Method of Erasability:

An erasing rate (five reciprocations) was measured (n=100) according to E (character erasing rate: =erasing rate)=1−M/C)×100 (M: density of erased part, C: density of colored part) based on an erasing ability (character erasing rate) test of plastic character erasing disclosed in JIS S 6050-2008.

TABLE 1

|  | Example | | | Comparative | Example | | Comparative | Example |
| --- | --- | --- | --- | --- | --- | --- | --- | --- |
|  | 1 | 2 | 3 | Example 1 | 4 | 5 | Example 2 | 6 |
| Thickness of resin film (μm) | 0.05 | 0.04 | 0.05 | — | 0.95 | 0.13 | — | 0.01 |
| Flexural strength (N) | 0.48 | 0.40 | 0.42 | 0.38 | 0.32 | 0.40 | 0.20 | 0.75 |
| Color developability of drawn lines | 20.3 | 21.5 | 19.4 | 15.5 | 22.5 | 22.0 | 17.5 | 16.2 |
| Light resistance | 12.1 | 12.2 | 11.5 | 14.1 | 5.5 | 12.1 | 10.5 | 14.1 |
| Erasability (%) | 98.1 | 98.2 | 99.0 | 94.6 | 98.2 | 97.8 | 85.6 | 94.6 |

Observing the results shown in Table 1 described above, the calcined color pencil leads prepared by using boron nitride as the raw material are compared in Examples 1 to 3 and Comparative Example 1; the non-calcined color pencil leads are compared in Examples 4 and 5 and Comparative Example 2; the calcined color pencil lead prepared by using graphite as the raw material is shown in Example 6; and it has become clear that the pencil leads prepared in Examples 1 to 6 falling in the scope of the present invention are excellent in a flexural strength, a color developability of the drawn lines, a light resistance, and an erasability as compared with the pencil leads prepared in Comparative Examples 1 and 2 falling outside the scope of the present invention.

INDUSTRIAL APPLICABILITY

The color pencil leads of the present invention can suitably be used as color pencil leads for mechanical pencils and color pencil leads for wooden pattern holder pencils.

What is claimed is:

1. A color pencil lead containing a resin which is at least one of modified phenol resin, ketone resin, maleic acid resin and aldehyde resin, wherein the resin in which a dye is dissolved or included has a film form having a thickness of 1 μm or less in a pencil lead body.

2. The color pencil lead as described in claim 1, wherein the resin in which the dye is dissolved or included is soluble in an organic solvent.

3. The color pencil lead as described in claim 1, wherein the pencil lead body is a calcined ceramic lead body prepared by blending at least boron nitride with a ceramic binder and calcining the blending.

4. The color pencil lead as described in claim 1, wherein the pencil lead body is a non-calcined ceramic lead body prepared by blending at least a ceramic binder and molding the blending.

5. The color pencil lead as described in claim 1, wherein the pencil lead body is a non-calcined ceramic lead body prepared by blending at least talc with a resin and molding the blending.

6. The color pencil lead as described in claim 1, wherein the pencil lead body is a calcined lead body prepared by blending at least graphite and calcining the blending.

7. The color pencil lead as described in claim 1, wherein it is impregnated with a lubricant.

8. A color pencil lead containing a resin in which a dye is dissolved or included, the resin being selected from the group consisting of modified phenol resins, ketone resins, maleic acid resins and aldehyde resins;

or the resin in which the dye is included being selected from the group consisting of butyral resins, modified phenol resins, ketone resins, maleic acid resins, aldehyde resins, alkyl celluloses, acryl resins and sulfonic acid resins.

* * * * *